United States Patent
Howard

(10) Patent No.: US 12,009,770 B2
(45) Date of Patent: Jun. 11, 2024

(54) SYSTEM AND METHOD FOR PROVIDING GRID-FORMING CONTROL OF AN INVERTER-BASED RESOURCE

(71) Applicant: General Electric Company, Schenectady, NY (US)

(72) Inventor: Dustin Howard, Brookhaven, GA (US)

(73) Assignee: GE Infrastructure Technology LLC, Greenville, SC (US)

( * ) Notice: Subject to any disclaimer, the term of this patent is extended or adjusted under 35 U.S.C. 154(b) by 21 days.

(21) Appl. No.: 17/589,063

(22) Filed: Jan. 31, 2022

(65) Prior Publication Data

US 2023/0246574 A1   Aug. 3, 2023

(51) Int. Cl.
| | |
|---|---|
| H02P 9/00 | (2006.01) |
| F03D 9/25 | (2016.01) |
| H02J 3/00 | (2006.01) |
| H02J 3/24 | (2006.01) |
| H02J 3/38 | (2006.01) |
| H02P 101/15 | (2016.01) |

(52) U.S. Cl.
CPC .............. *H02P 9/007* (2013.01); *H02J 3/001* (2020.01); *H02J 3/241* (2020.01); *H02J 3/381* (2013.01); *F03D 9/255* (2017.02); *H02J 2300/28* (2020.01); *H02P 2101/15* (2015.01)

(58) Field of Classification Search
CPC ...... H02P 9/007; H02P 2101/15; H02J 3/001; H02J 3/241; H02J 3/381; H02J 2300/28; H02J 3/16; F03D 9/255; F03D 7/0284
See application file for complete search history.

(56) References Cited

U.S. PATENT DOCUMENTS

| | | | |
|---|---|---|---|
| 5,798,633 A | 8/1998 | Larsen et al. | |
| 7,804,184 B2 | 9/2010 | Yuan et al. | |
| 9,270,194 B2 | 2/2016 | Brogan et al. | |
| 2010/0142237 A1 | 6/2010 | Yuan et al. | |
| 2015/0249416 A1* | 9/2015 | Barker | H02P 9/10 290/44 |

FOREIGN PATENT DOCUMENTS

| | | |
|---|---|---|
| WO | WO2021/145877 A1 | 7/2021 |
| WO | WO 2021/209154 A1 | 10/2021 |

OTHER PUBLICATIONS

EP Search Report for EP application No. 23150980.3, dated Jun. 21, 2023, 8 pages.

(Continued)

*Primary Examiner* — Hal Kaplan
*Assistant Examiner* — Thai H Tran
(74) *Attorney, Agent, or Firm* — Dority & Manning, P.A.

(57) ABSTRACT

A method and associated system for providing grid-forming (GFM) control of an inverter-based resource (IBR) connected to an electrical grid include monitoring the electrical grid for grid events that cause a change in one or both of grid frequency and angle. Via a controller, an active power response of the IBR to the grid event is controlled by changing an angle of the IBR voltage relative to grid voltage in a manner so as to mimic an active power response of an IBR having a certain desired impedance that may similar to or different from a hardware impedance of the IBR itself.

12 Claims, 10 Drawing Sheets

(56) References Cited

OTHER PUBLICATIONS

Reigstad, Tor Inge et al., Virtual Inertia Implementation in Variable Speed Hydropower Plant, 2019 Modern Electric Power Systems (MEPS), IEEE, Sep. 9, 2019, pp. 1-6.

Rosso, Roberto et al., Grid-Forming Converters: Control Approaches, Grid-Synchronization, and Future Trends—A Review, IEEE Open Journal of Industry Applications, IEEE, vol. 2, Apr. 19, 2021, pp. 93-109.

* cited by examiner

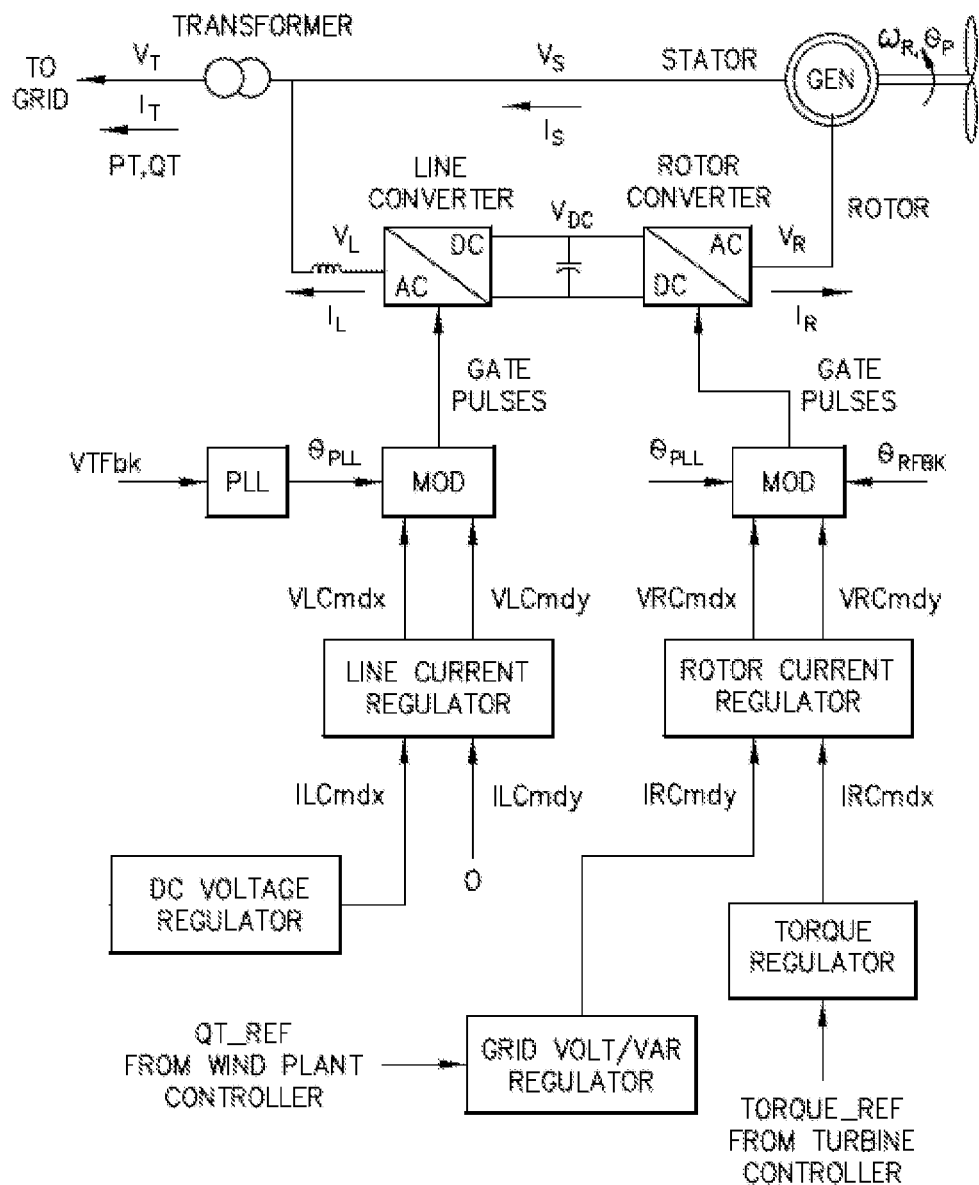
FIG. -1-
PRIOR ART

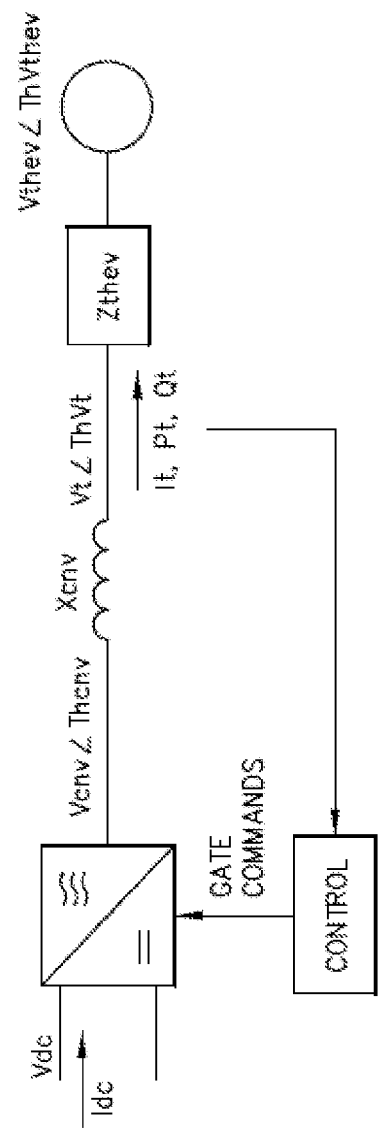
FIG. -2-
PRIOR ART

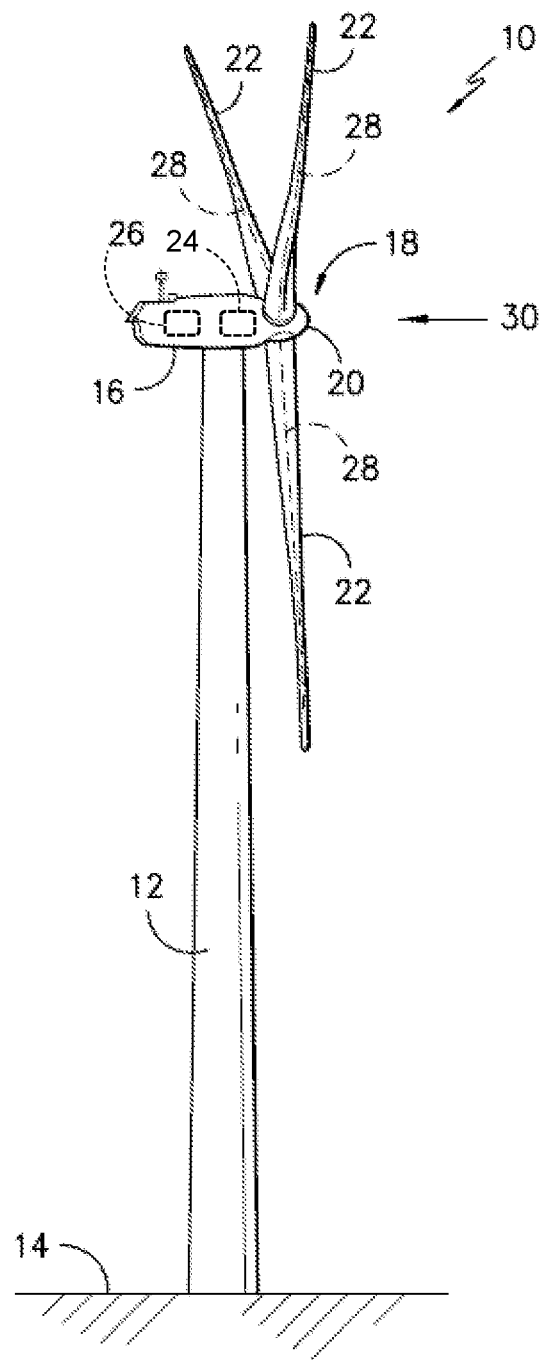
*FIG. -3-*

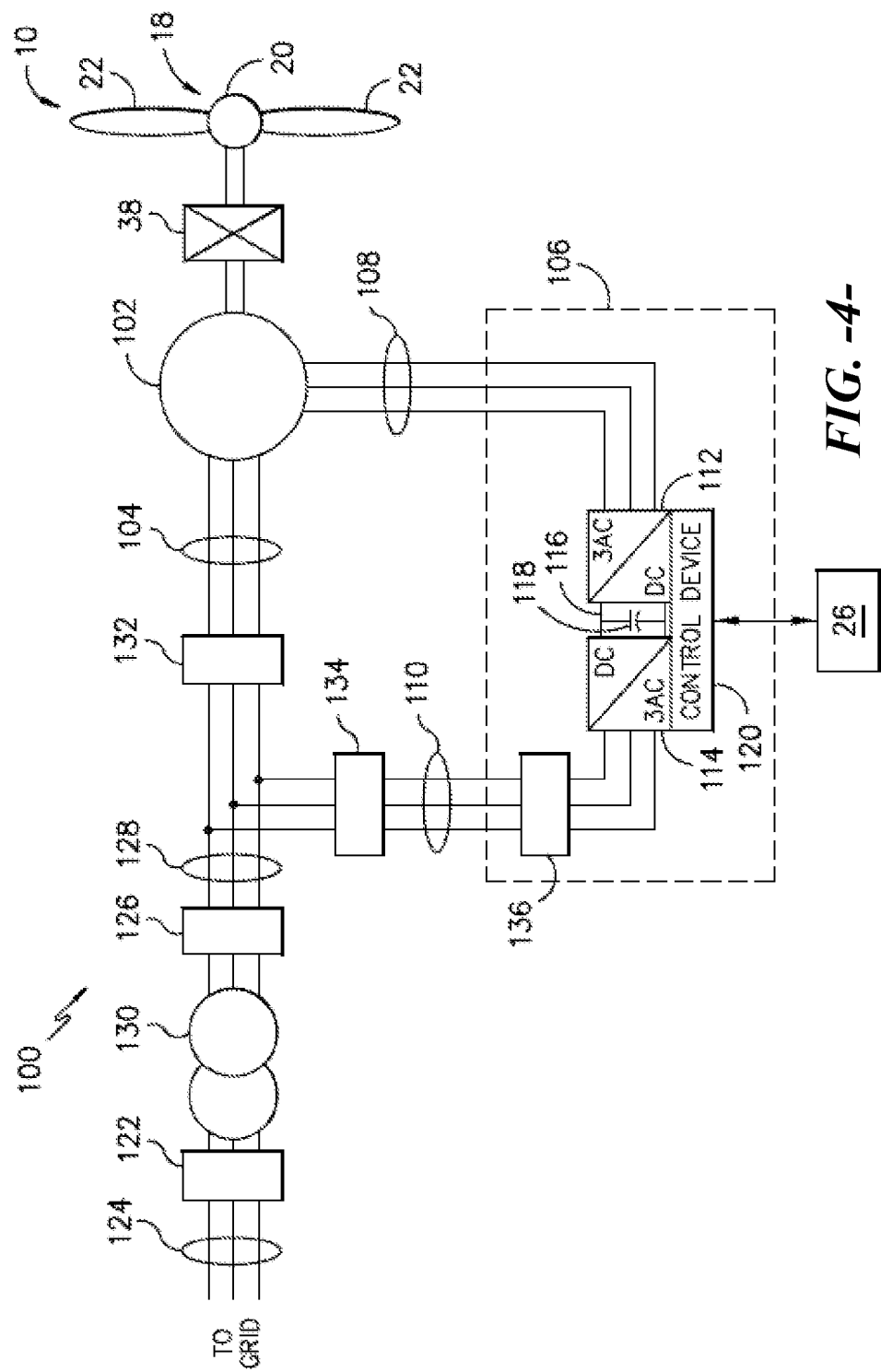
FIG. -4-

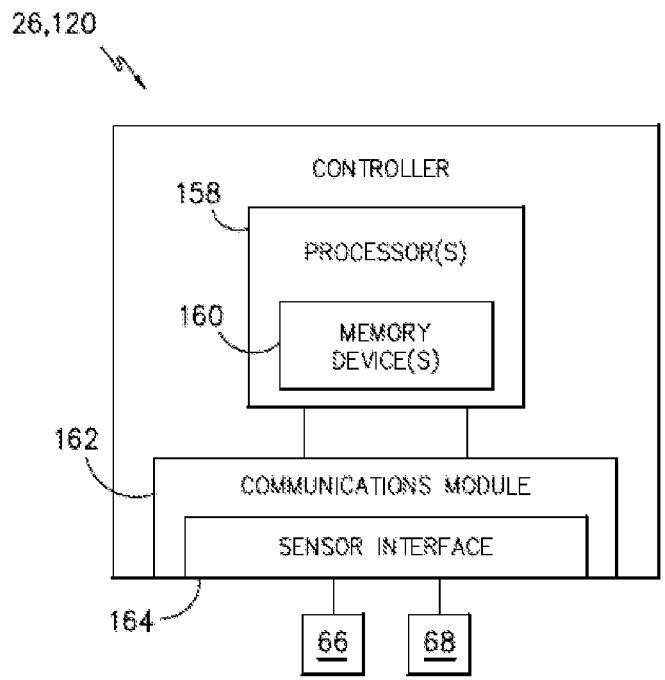
FIG. -5-
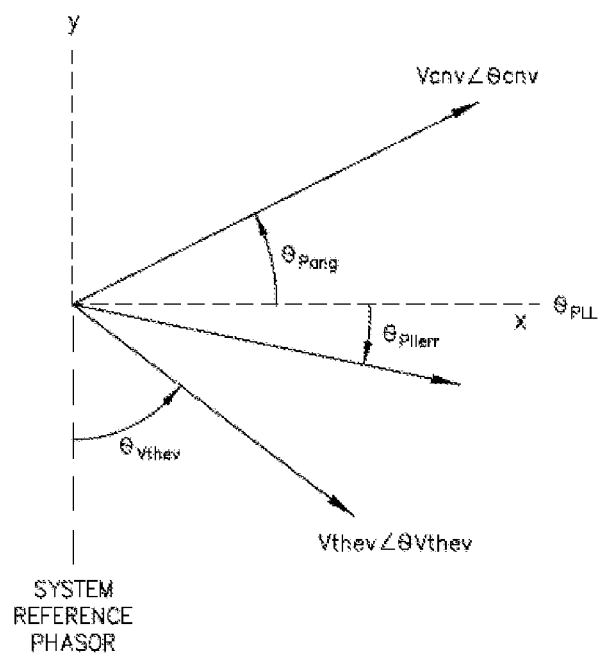
FIG. -7-

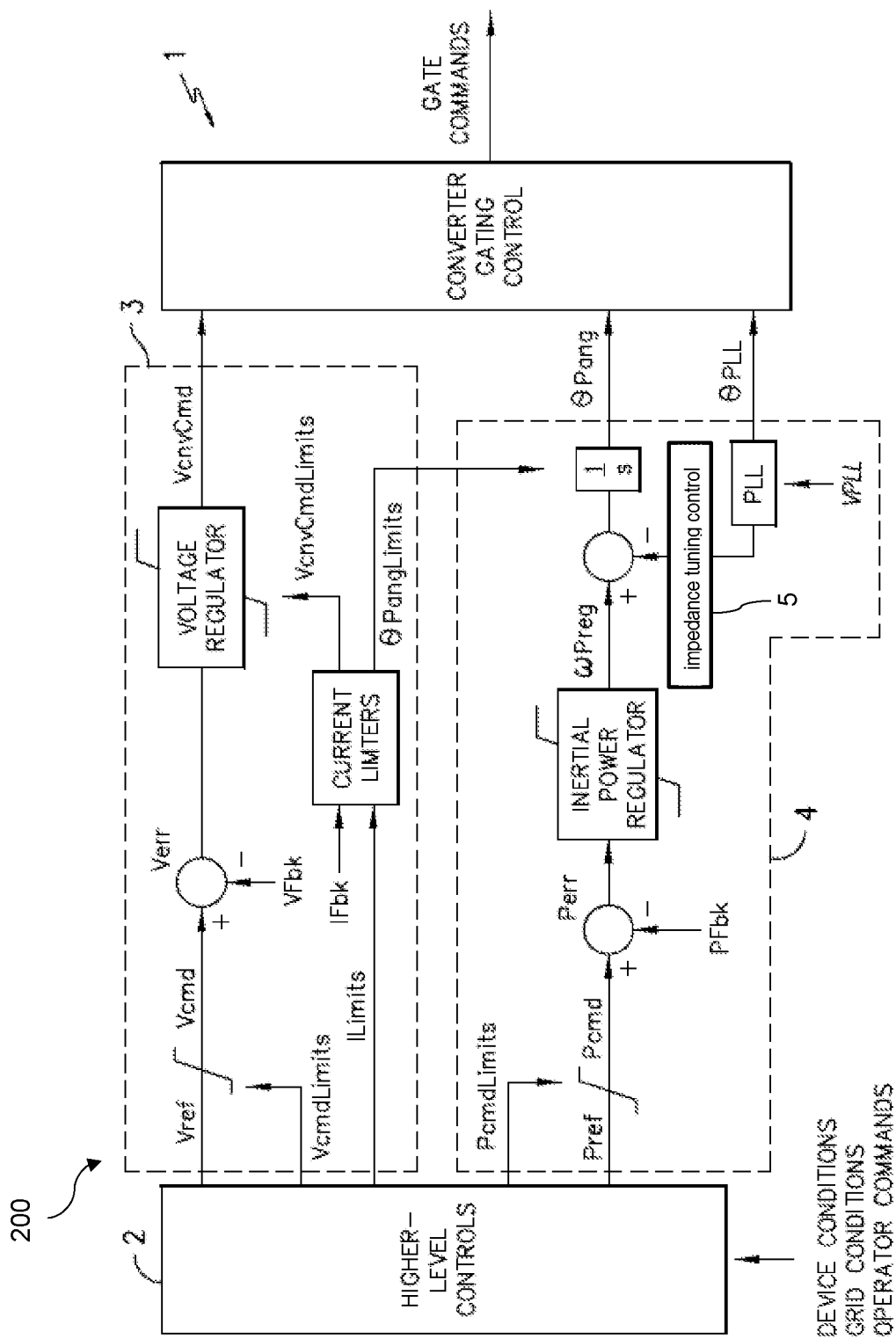
FIG. -6-

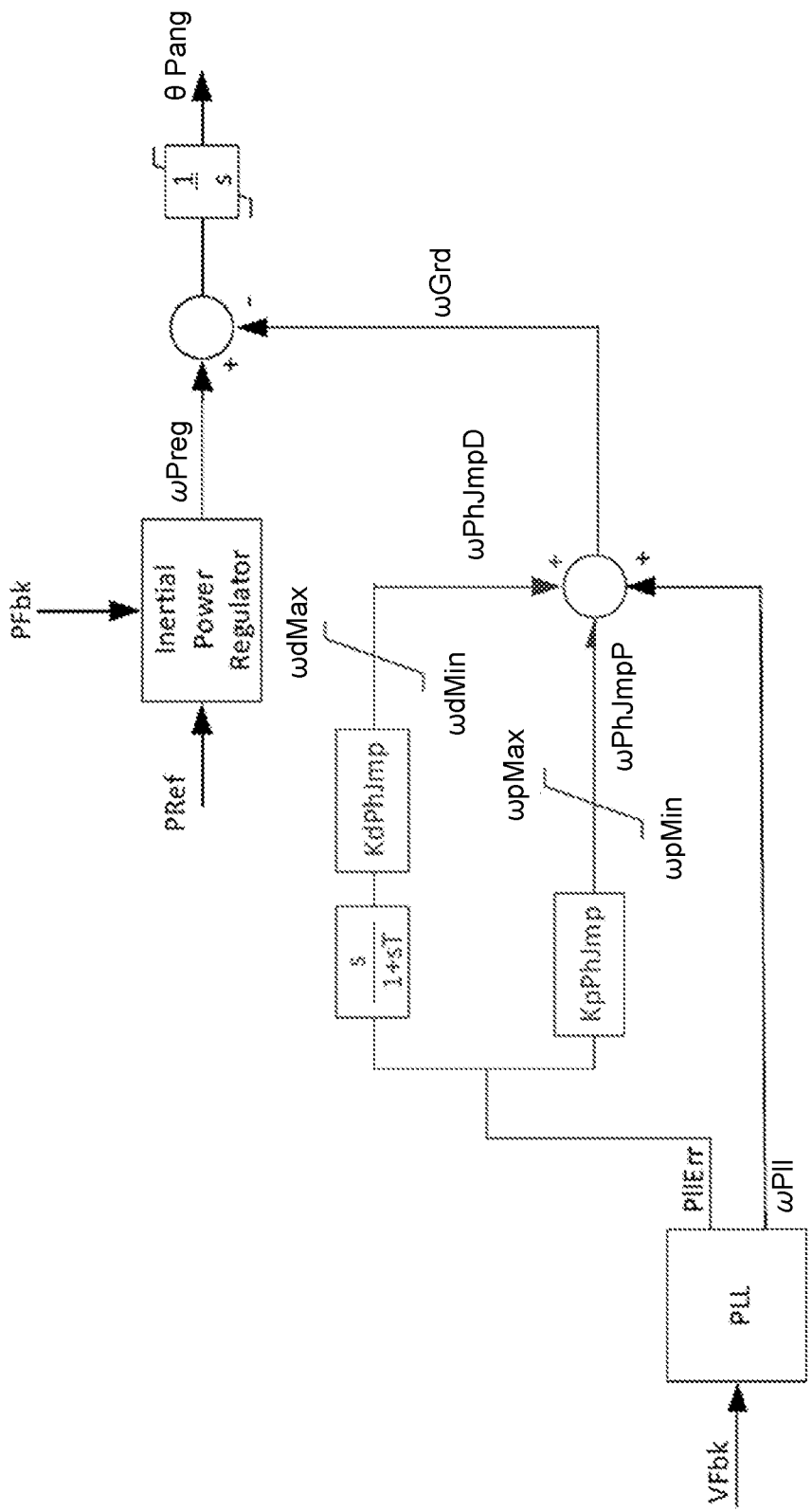
FIG. -8-

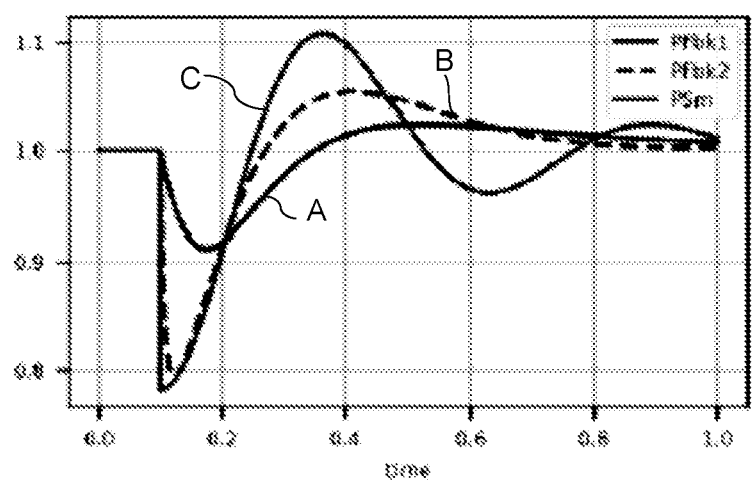
FIG. -9-

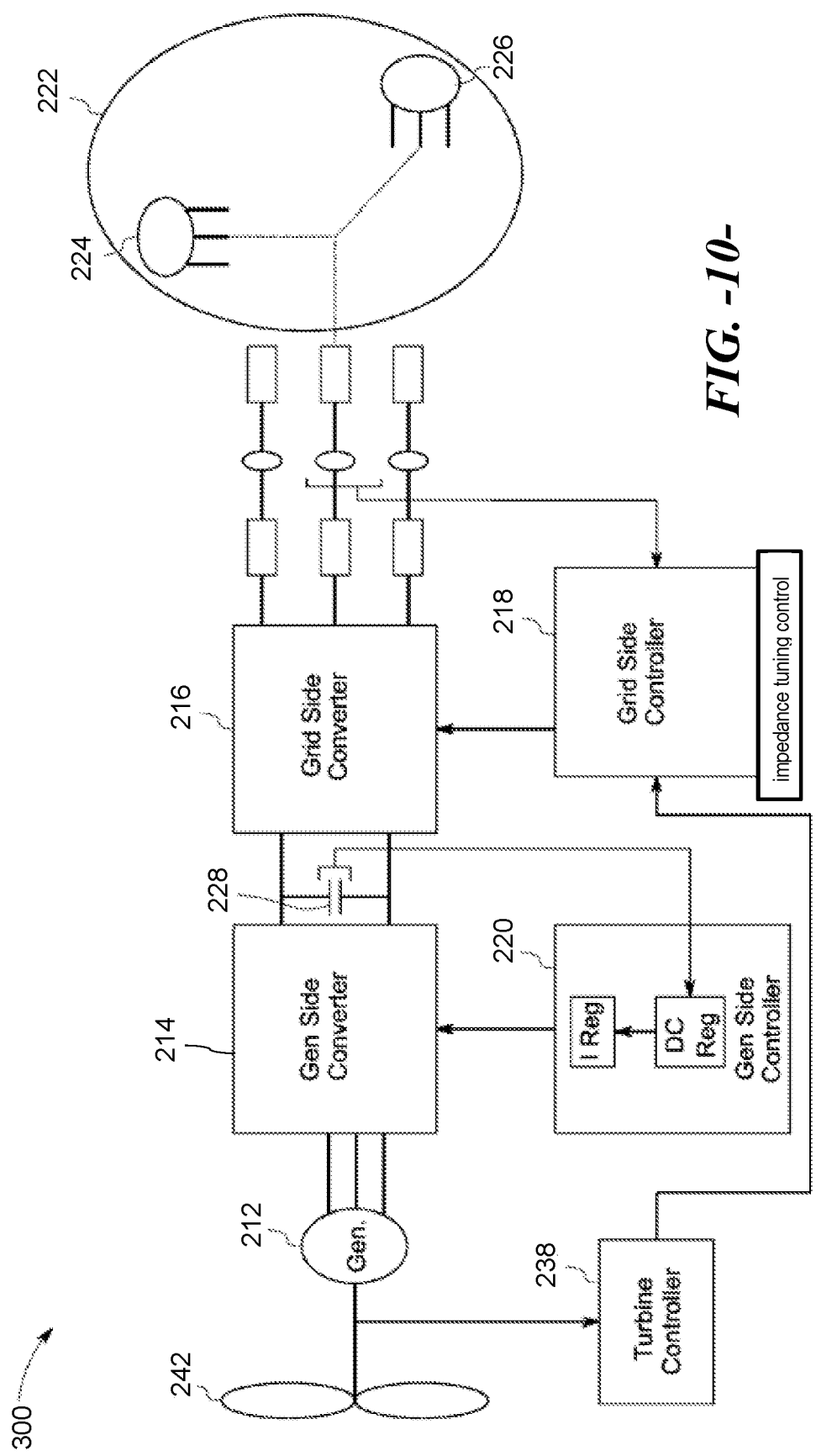
FIG. -10-

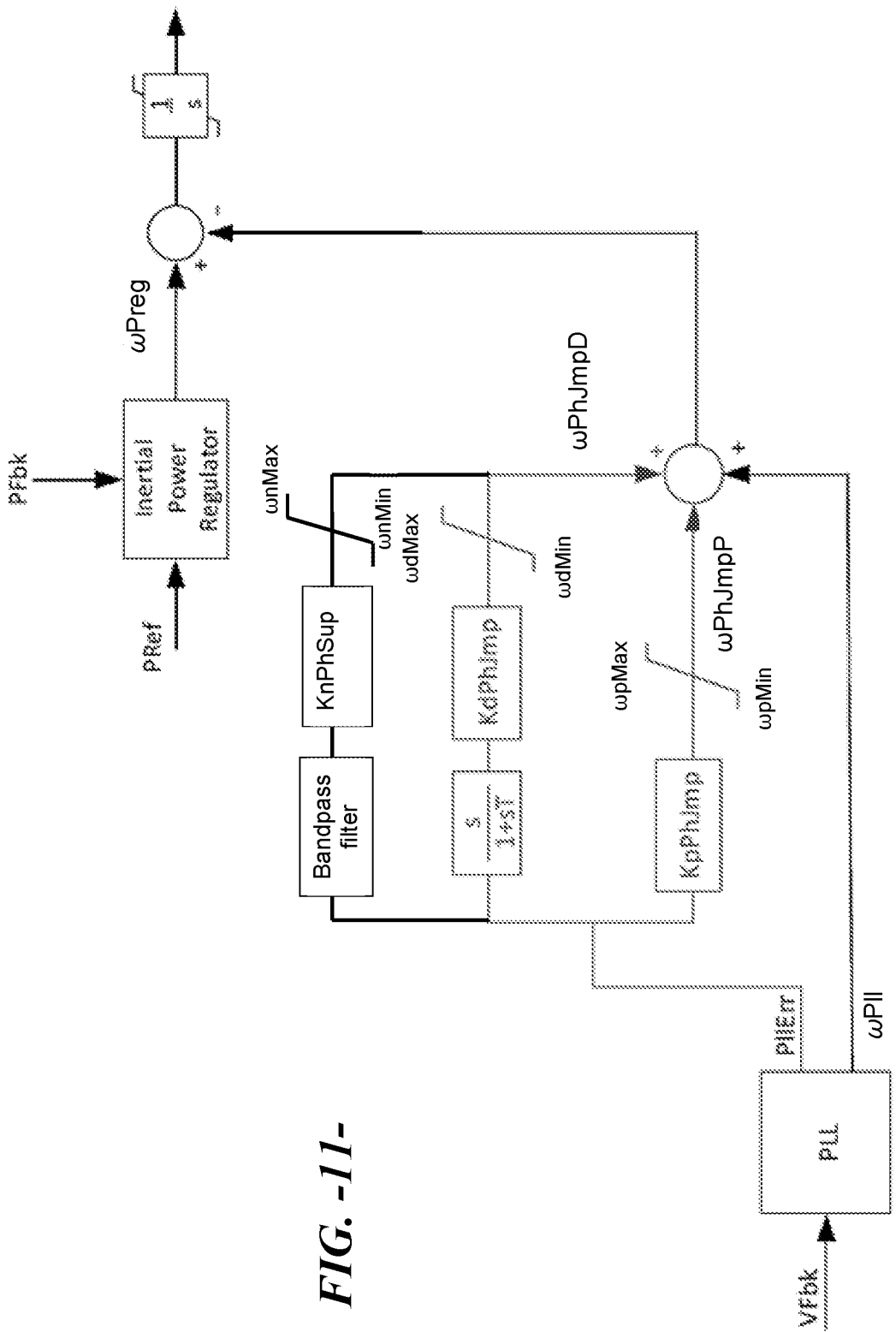
FIG. -11-

SYSTEM AND METHOD FOR PROVIDING GRID-FORMING CONTROL OF AN INVERTER-BASED RESOURCE

FIELD

The present disclosure relates generally to inverter-based resources, such as wind turbine power systems and, more particularly, to systems and methods for providing grid-forming control for inverter-based resources.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

Many existing renewable generation sources, such as double-fed wind turbine generators, may operate in a "grid-following" mode and utilize fast current-regulation loops to control active and reactive power exchanged with the grid. More specifically, FIG. 1 illustrates the basic elements of the main circuit and converter control structure for a grid-following double-fed wind turbine generator. As shown, the active power reference to the converter is developed by the energy source regulator, e.g., the turbine control portion of a wind turbine, and is conveyed as a torque reference which represents the lesser of the maximum attainable power from the energy source at that instant, or a curtailment command from a higher-level grid controller. The converter control then determines a current reference for the active component of current to achieve the desired torque. Accordingly, the double-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, an inverter-based resource (IBR) (such as a double-fed wind turbine generator and controls) may operate under "grid-forming" (GFM) control wherein the IBR acts as a voltage source behind an impedance (primarily reactance) and provides a voltage-source characteristic, where the angle and magnitude of the voltage are controlled to achieve the regulation functions needed by the grid. In particular, the impedance of the IBR is normally dictated by the hardware of the system, such as reactors, transformers, or rotating machine impedances. With this structure, current will flow according to the demands of the grid, while the converter contributes to establishing a voltage and frequency for the grid. This characteristic is comparable to conventional generators based on a turbine driving a synchronous machine.

Thus, a GFM source desirably includes the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above GFM objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Doubly-Feb Wind Turbine Generator."

The principle of a GFM IBR as "a voltage source behind an impedance" is represented in the schematic diagram of FIG. 2. As shown, the main circuit includes a power-electronic converter (e.g., an IBR) with connections on DC and AC sides. The converter receives gating commands from a controller that creates an AC voltage phasor Vcnv at an angle of Thvcnv with respect to a reference phasor having a fixed frequency. The DC side is supplied with a device capable of generating or absorbing power for even a short duration. Such devices may include, for example, batteries, solar panels, rotating machines with a rectifier, or capacitors. In addition, as shown, the circuit includes an inductive reactance Xcnv connecting the converter to its point of interconnection (voltage Vt and angle ThVt). The electrical system behind the point of interconnect is shown as a Thevenin equivalent with impedance Zthev and voltage Vthev at angle ThVthev. In practical situations, the impedance Zthev will be primarily inductive reactance. This equivalent can be used to represent any circuit, including grid-connected and islanded circuits with loads.

While FIG. 2 illustrates a single converter as an example, any grouping of equipment that can create an electrical equivalent of a controlled voltage Vcnv behind an impedance Xcnv can have the control schemes disclosed applied to achieve the same performance benefits.

The characteristic of a GFM IBR to act as a voltage source behind an impedance provides several benefits for grid stability, including providing a stabilizing effect on grid frequency and angle. However, the amount of grid-supporting features that can be provided by the IBR must be constrained to avoid pushing the IBR beyond its capabilities or design rating.

In view of the foregoing, an improved system and method that addresses the aforementioned issue would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for providing grid-forming (GFM) control of an inverter-based resource (IBR) connected to an electrical grid. The method includes tuning the reactance of the IBR to provide flexibility as to the amount of transient active power provided by the IBR to the grid such that the grid-supporting function of the IBR can be maximized while maintaining the level of support to within the design capabilities of the IBR.

In a particular embodiment, the method includes monitoring the electrical grid for grid events that cause a change in one or both of grid frequency and angle. The method then controls, via a controller, an active power response of the IBR to the grid event by changing at least one of frequency or angle of the IBR voltage relative to grid voltage in a manner so as to mimic an active power response of an IBR having a certain desired impedance. For example, the desired impedance may be substantially the same as or different than a hardware impedance of the IBR.

The method may include estimating the grid frequency and angle using a phase-locked loop (PLL), wherein changes in grid frequency and angle are reflected in a PLL frequency and a PLL error. The PLL error becomes non-zero for rapid changes in grid frequency or angle, and the method may include calculating a first frequency component that is a derivate of the PLL error and a second frequency component that is proportional to the PLL error.

A particular embodiment of the method includes: summing the first and second frequency components with the PLL frequency to obtain a high-bandwidth estimation of grid frequency; combining the high-bandwidth estimation of grid frequency with an inertial power regulator frequency; and integrating the combined high-bandwidth estimation of grid frequency and inertial power regulator frequency to generate an internal angle reference for grid-forming control of the IBR.

Embodiments of the method may include tuning gains applied to the first and second frequency components to be more or less responsive to the grid events. Limits may be applied to high bandwidth components of estimated grid frequencies, the limits being fixed values or dynamically adjustable values.

The method is particularly well-suited for control of a wind turbine generator in a wind turbine power system, wherein the IBR is a double-fed or full-power conversion wind turbine generator connected to the electrical grid and coupled to a power converter having a line-side converter and a rotor-side converter coupled together via a DC link.

The present invention also encompasses various system embodiments for controlling a power generating system in a grid-forming (GFM) control mode, the power system having an inverter-based resource (IBR) connected to an electrical grid. The system may include a controller comprising at least one processor that is configured to perform a plurality of operations, the plurality of operations including: monitoring the electrical grid for grid events that cause a change in one or both of grid frequency and angle; and controlling an active power response of the IBR to the grid event by changing at least one of frequency or angle of the IBR voltage relative to grid voltage in a manner in a manner so as to mimic an active power response of an IBR having a certain desired impedance, wherein the desired impedance may be different than a hardware impedance of the IBR.

In a particular embodiment, the power system is a wind turbine power system and the IBR includes a double-fed wind turbine generator connected to the electrical grid.

In various embodiments of the system, the controller may be configured to perform any one or combination of the functions discussed above with respect to the method embodiments.

The present invention also encompasses a converter controller for providing grid-forming (GFM) control of an inverter-based resource (IBR) connected to an electrical grid, the converter controller including a controller with at least one processor configured to perform a plurality of operations, including: monitoring the electrical grid for grid events that cause a change in one or both of grid frequency and angle; and controlling an active power response of the IBR to the grid event by changing at least one of frequency or angle of the IBR voltage relative to grid voltage in a manner so as to mimic an active power response of a GFM IBR source having a certain desired impedance that may be similar to or different from the hardware component impedance of the IBR itself In various embodiments of the system, the controller may be configured to perform any one or combination of the functions discussed above with respect to the method embodiments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a one-line diagram of a double-fed wind turbine generator with structure of converter controls for grid-following application according to conventional construction;

FIG. 2 illustrates a schematic diagram of one embodiment of a main circuit of a grid-forming system according to conventional construction;

FIG. 3 illustrates a perspective view of one embodiment of a wind turbine according to the present disclosure;

FIG. 4 illustrates a schematic view of one embodiment of a wind turbine electrical power system suitable for use with the wind turbine shown in FIG. 1;

FIG. 5 illustrates a block diagram of one embodiment of a controller according to the present disclosure;

FIG. 6 illustrates a control diagram of one embodiment of system for providing grid-forming control of an inverter-based resource according to the present disclosure;

FIG. 7 illustrates a schematic view of one embodiment of a phasor diagram that depicts phasor relationships between system voltages, a phase-locked loop, and a fixed-frequency reference according to the present disclosure;

FIG. 8 illustrates a control diagram of the impedance tuning control function of the system of FIG. 6;

FIG. 9 is a graph depicting the active power response of a GFM IBR to a grid phase jump;

FIG. 10 illustrates a schematic view of another embodiment of a wind turbine electrical power system suitable for use with the wind turbine shown in FIG. 1; and FIG. 11 illustrates a control diagram of an alternative embodiment of the impedance tuning control function.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for providing grid-forming (GFM) control via an inverter-based resource (IBR). In general, the methods and systems relate to tuning the reactance of the IBR to provide flexibility as to the amount of transient active power provided by the IBR to the grid such that the grid-supporting function of the IBR can be maximized while maintaining the level of support to within the design capabilities of the IBR. The control methodology involves controlling an active power response of the IBR to a grid event (that results in a change in grid frequency or angle) by changing an angle of the IBR voltage relative to grid voltage in a manner so as to mimic an active power response of a GFM source having a different impedance.

Referring now to the drawings, FIG. 3 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Referring now to FIG. 4, a schematic diagram of one embodiment of a wind turbine power system 100 is illustrated in accordance with aspects of the present disclosure. Although the present disclosure will generally be described herein with reference to the wind turbine 10 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 4 and as mentioned, the rotor 18 of the wind turbine 10 (FIG. 3) may, optionally, be coupled to the gearbox 38, which is, in turn, coupled to a generator 102, which may be a doubly fed induction generator (DFIG). The DFIG 102 may be connected to a stator bus 104 and a converter 106 may be connected to the DFIG 102 via a rotor bus 108, and to the stator bus 104 via a line side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor side converter (RSC) 112 and a line side converter (LSC) 114. The DFIG 102 is coupled via the rotor bus 108 to the rotor side converter 112. Additionally, the RSC 112 is coupled to the LSC 114 via a DC link 116 across which is a DC link capacitor 118. The LSC 114 is, in turn, coupled to the line side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor side converter 112 and/or the line side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g., three-phase) alternating current (AC) power is provided to the power converter 106. The rotor side converter 112 converts the AC power provided from the rotor bus 108 into direct current (DC) power and provides the DC power to the DC link 116. As is generally understood, switching elements (e.g., IGBTs) used in the bridge circuits of the rotor side converter 112 may be modulated to convert the AC power provided from the rotor bus 108 into DC power suitable for the DC link 116.

In addition, the line side converter 114 converts the DC power on the DC link 116 into AC output power suitable for the electrical grid 124. In particular, switching elements (e.g., IGBTs) used in bridge circuits of the line side converter 114 can be modulated to convert the DC power on the DC link 116 into AC power on the line side bus 110. The AC power from the power converter 106 can be combined with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the controller 26 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

The wind turbine power system 100 described herein may be part of a wind farm that includes a plurality of wind turbines, such as the wind turbine 10 described above, and an overall farm-level controller. The individual turbine controllers of the plurality of wind turbines are communicatively coupled to the farm-level controller, e.g., through a wired connection, such as by connecting the turbine controller 26 through suitable communicative links (cable or wireless). The farm-level controller is configured to send and receive control signals to and from the various wind turbines, such as for example, distributing real and/or reactive power demands across the wind turbines of the wind farm.

Referring now to FIG. 5, a block diagram of one embodiment of suitable components that may be included within the controller (such as any one of the converter controller 120, the turbine controller 26, and/or the farm-level controller described herein) in accordance with example aspects of the present disclosure is illustrated. As shown, the controller may include one or more processor(s) 58, computer, or other suitable processing unit and associated memory device(s) 60 that may include suitable computer-readable instructions that, when implemented, configure the controller to perform various different functions, such as receiving, transmitting and/or executing wind turbine control signals (e.g., performing the methods, steps, calculations, and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. An interface can include one or more circuits, terminals, pins, contacts, conductors, or other components for sending and receiving control signals. Moreover, the controller may include a sensor interface 64 (e.g., one or more analog-to-digital converters) to permit signals transmitted from the sensors 66, 68 to be converted into signals that can be understood and processed by the processor(s) 58.

The term "inverter-based resource (IBR)" used herein is a term of art and is generally understood to mean renewable generation energy sources (e.g., wind, solar, and energy storage power plants) that are asynchronously connected to the electrical grid completely or partially through power electronic inverters.

Referring now to FIG. 6, a control diagram of a system 200 for providing grid-forming (GFM) control according to aspects of the present methods and systems is illustrated. As shown, the converter controller 1 receives references (e.g., Vref and Pref) and limits (e.g., VcmdLimits and PcmdLimits) from higher-level controls 2. These high-level limits are on physical quantities of voltage, current, and power. The main regulators include a fast voltage regulator 3 and a slow power regulator 4. These regulators 3, 4 have final limits applied to the converter control commands for voltage magnitude (e.g., VcnvCmd) and angle (e.g., θPang and θPLL) to implement constraints on reactive- and real-components of current, respectively. Further, such limits are based upon a pre-determined fixed value as a default, with closed-loop control to reduce the limits should current exceed limits.

The system 200 includes a unique power regulator structure and functionality for GFM control wherein the angle or frequency of the IBR voltage relative to grid voltage is controlled in a manner so as to mimic an active power response of an IBR having a certain desired impedance that is different from the impedance of the hardware components of the inverter-based resource itself. In particular, the system 200 implements an impedance tuning control functionality 5 for this purpose, which is explained in greater detail below with reference to FIG. 8.

For background and understanding of certain principles related to the present methodology, reference is made to the phasor diagram of FIG. 7, which defines the phasor relationships between the system voltages, the phase-locked loop (PLL), and the fixed-frequency reference. Accordingly, power flow is a function of the converter angle relative to the remote equivalent and the impedances of the system 200, as well as voltage amplitudes. For purposes of the present disclosure, resistances are assumed to be negligible. Thus, for the GFM circuit of FIG. 6, the following physical relationships exist:

$$P = Vcnv * Vthev * \sin(\theta_{Vcnv} - \theta_{Vthev}) / (Xcnv + Xthev) \quad \text{Equation (1)}$$

$$P = Vt * Vthev * \sin(\theta_{Vt} - \theta_{Vthev}) / (Xthev) \quad \text{Equation (2)}$$

$$P = Vcnv * Vt * \sin(\theta_{Vcnv} - \theta_{Vt}) / (Xcnv) \quad \text{Equation (3)}$$

Where P is the power,
Vcnv is the converter voltage,
Vthev is the Thevenin equivalent voltage,
Vt is the terminal voltage,
$\theta_{Vcnv}$ is the angle of the converter voltage;
$\theta_{Vthev}$ is the angle of the Thevenin equivalent voltage,
$\theta_{Vt}$ is the angle of the terminal voltage in the system,
Xcnv is the converter impedance, and
Xthev is the Thevenin equivalent impedance.

Accordingly, the converter gating logic of FIG. 6 is configured to create a converter voltage with an angle based upon the control signal $\theta_{Pang}$ and $\theta_{PLL}$. In other embodiments, the voltage with angle based on $\theta_{Pang}$ and $\theta_{PLL}$ may be created by other equipment capability of creating a voltage phasor. In the illustrated embodiment, the phase-locked loop (Pll) measures the angle $\theta_{PLL}$, which in steady-state is equal to the angle $\theta_{Vt}$ of the voltage Vt in the system. In such embodiments, these values are with respect to the system reference angle. During a grid event or transient wherein one or both of grid frequency and angle changes, an error signal $\theta_{PLLerr}$ (FIG. 7) is generated in this measurement as shown in FIG. 10.

Therefore, the following relationships exist with respect to the control angle signals:

$$\theta_{Vcnv} = \theta_{Pang} + \theta_{PLL} \quad \text{Equation (4)}$$

$$\theta_{PLL} = \theta_{Vt} - \theta_{PLLerr} \quad \text{Equation (5)}$$

$$\theta_{Vcnv} = \theta_{Pang} + \theta_{Vt} - \theta_{PLLerr} \quad \text{Equation (6)}$$

$$(\theta_{Vcnv} - \theta_{Vt}) = \theta_{Pang} - \theta_{PLLerr} \quad \text{Equation (7)}$$

$$P = Vcnv * Vt * \sin(\theta_{Pang} - \theta_{PLLerr}) / (Xcnv) \quad \text{Equation (8)}$$

Thus, the active power from the GFM IBR is primarily a function of the angle between the GFM voltage and the grid voltage represented by (θPang−θPLLerr) in Equation 8 and the internal impedance (Xcnv) of GFM IBR, which is a generally fixed inherent characteristic of the system. Aspects of the present method and system involve transiently changing the angle of the GFM IBR in such a way to mimic the active power response of a GFM IBR having a different internal impedance. By dynamically changing the angle of the GFM in this manner, the active power response of the system to grid phase angle and grid frequency changes can be tuned.

Referring to FIG. 8, from the voltage feedback signal (VFbk) supplied to the PLL, grid frequency and angle are estimated by the PLL. As discussed above, sudden changes in grid frequency or angle appear in both the PLL frequency (ωPll) and the PLL error (PllErr). In particular, the PLL error becomes non-zero for sudden changes in grid frequency and/or angle. This error signal is used to calculate two frequency components—one reflecting a derivative of the PLL error (ωPhJmpD) and another being proportional to the PLL error (ωPhJmpP). These two frequency components are summed together with the PLL frequency (ωPll) to obtain a high-bandwidth estimation of grid frequency (ωGrd). This frequency is then combined with the inertial power regulator frequency (ωPreg) and integrated to obtain the desired internal angle (θ Pang) reference for the converter controller (FIG. 6) of the GFM IBR.

By the addition of the derivative (ωPhJmpD) and proportional (ωPhJmpP) terms of the PLL error, the (θ Pang) response may be tuned to be more or less aggressive to grid phase and/or frequency changes by tuning the respective gains (KdPhJmp) and (KpPhJmp) applied to the frequency component signals. The limits (ωdMax)/(ωdMax) and (ωpMax)/(ωpMax) applied to the frequency component signals may also be selected to constrain aggressive behavior for relatively small grid phase/frequency events. These limits may be fixed values or adjusted dynamically based on operating point of the resource.

The graph of FIG. 9 depicts the effect of the tunable impedance response of the IBR to a grid phase jump in accordance with aspects of the present control methodology. The line "A" reflects the active power without the additional proportional and derivative terms discussed above with respect to FIG. 8. The dashed line "B" is the same response modified with the proportional and derivative terms, as discussed above. The line "C" is a theoretical synchronous machine response to the phase jump. By tuning the parameters of the proportional and derivate terms, the initial phase jump response is made to more closely reflect active power change similar to a synchronous machine.

FIG. 10 depicts an alternative embodiment of a wind turbine power system 300 that may incorporate aspects of the present invention. The configuration of this system 300 is referred to in the industry as a "full-power conversion (FPC)" wind turbine generator and is described, for example, in US Patent Application Publication 2020/0142237 (incorporated herein by reference for all purposes). Briefly, the power generating system 300 includes the wind generator 212, the generator side converter 214, and the grid side converter 216. The system further includes the grid side controller 218, the generator side controller 220 and the power grid 222, which typically includes traditional synchronous generators 224 and electrical loads 226. The wind generator 212 may comprise a squirrel cage induction generator, a synchronous generator, or a permanent magnet synchronous generator.

The generator side controller 220 generates the switching signals for the generator side converter 214. In this embodiment, the generator side controller helps in maintaining the DC link voltage to a desired value. The grid side converter 216 is controlled as a voltage source connected to the grid 222. In other words, the grid side controller 218 controls the phase and amplitude of the output voltage of the grid side converter directly. The grid side converter 216, when controlled as the voltage source, responds to grid changes as a voltage behind a reactance. Thus, the wind generator 212 operates in a similar manner as a synchronous generator.

The grid side controller 218 of the embodiment of FIG. 10 receives the power reference from the turbine controller 238. An internal frequency reference is generated based on the power imbalance between the reference power and the actual electrical power supplied to the grid. In one embodiment, a power/frequency (P/F) regulator (not shown) may be used to share the power with other wind turbines, i.e., for paralleling operation of wind turbines. The power frequency regulator determines the phase angle reference for the grid side controller 218.

As schematically indicated in FIG. 10, the impedance tuning control functionality according to aspects of the present invention and described in detail above may be incorporated/implemented by the grid side controller 218.

FIG. 11 depicts a control diagram having the configuration and functionality of the embodiment discussed above with respect to FIG. 8. This embodiment also includes another parallel path with a bandpass filter. This additional path may be specific to IBRs using wind-turbine generators, for the bandpass filter can tuned to a specific frequency to mitigate the impact of grid frequency/phase oscillations on natural modes of the wind turbine drivetrain mechanical systems. In other words, the bandpass filter path can be used to make the effective impedance of the IBR higher at certain frequencies to reduce the impact grid frequency/phase oscillations on WTG drivetrains.

Various aspects and embodiments of the present invention are defined by the following numbered clauses:

Clause 1: A method for providing grid-forming (GFM) control of an inverter-based resource (IBR) connected to an electrical grid, the method comprising:
monitoring the electrical grid for grid events that cause a change in one or both of grid frequency and angle; and
controlling, via a controller, an active power response of the IBR to the grid event by changing at least one of frequency or angle of the IBR voltage relative to grid voltage in a manner so as to mimic an active power response of an IBR having a certain desired impedance.

Clause 2: The method according to clause 1, wherein the desired impedance is similar to or different than a hardware impedance of the IBR.

Clause 3: The method according to clause 1-2, comprising estimating grid frequency and angle using a phase-locked loop (PLL), wherein changes in grid frequency and angle are reflected in a PLL frequency and a PLL error, wherein the PLL error becomes non-zero for rapid changes in grid frequency or angle, and further comprising calculating a first frequency component that is a derivative of the PLL error and a second frequency component that is proportional to the PLL error.

Clause 4: The method according to clauses 1-3, further comprising:
summing the first and second frequency components with the PLL frequency to obtain a high-bandwidth estimation of grid frequency;
combining the high-bandwidth estimation of grid frequency with an inertial power regulator frequency; and
integrating the combined high-bandwidth estimation of grid frequency and inertial power regulator frequency to generate an internal angle reference for grid-forming control of the IBR.

Clause 5: The method according to clauses 1-4, further comprising tuning gains applied to the first and second frequency components to be more or less aggressive to the grid events.

Clause 6: The method according to clauses 1-5, wherein limits are applied to high bandwidth components of estimated grid frequencies, the limits being fixed values or dynamically adjustable values.

Clause 7: The method according to clauses 1-6, further comprising applying a bandpass filter in parallel with the first and second frequency components, the bandpass filter tuned to a frequency to increase the effective impedance of the IBR at predetermined frequencies.

Clause 8: The method according to clauses 1-6, wherein the IBR is a double-fed or full-power conversion wind turbine generator in a wind turbine power system connected to the electrical grid, the double-fed wind turbine generator coupled to a power converter having a line-side converter and a rotor-side converter coupled together via a DC link.

Clause 9: A system for controlling a power generating system in grid-forming (GFM) mode, the power system having an inverter-based resource (IBR) connected to an electrical grid, the system comprising:
a controller comprising at least one processor, the at least one processor configured to perform a plurality of operations, the plurality of operations comprising:
monitoring the electrical grid for grid events that cause a change in one or both of grid frequency and angle; and
controlling an active power response of the IBR to the grid event by changing at least one of frequency or angle of the IBR voltage relative to grid voltage in a manner so as generate an effective impedance that mimics an active power response of a GFM source having a certain desired impedance.

Clause 10: The system according to clause 9, wherein the desired impedance is different than a hardware impedance of the IBR.

Clause 11: The system according to clauses 9-10, wherein the power generating system comprises a wind turbine power system and the IBR comprises a double-fed or full-power conversion wind turbine generator connected to the electrical grid.

Clause 12: The system according to clauses 9-11, wherein the controller is further configured to estimate grid frequency and angle using a phase-locked loop (PLL), wherein changes in grid frequency and angle are reflected in a PLL frequency and a PLL error, wherein the PLL error becomes non-zero for rapid changes in grid frequency or angle, the controller further configured to calculate a first frequency component that is a derivative of the PLL error and a second frequency component that is proportional to the PLL error.

Clause 13: The system according to clauses 9-12, wherein the controller is further configured for:

summing the first and second frequency components with the PLL frequency to obtain a high-bandwidth estimation of grid frequency;

combining the high-bandwidth estimation of grid frequency with an inertial power regulator frequency; and integrating the combined high-bandwidth estimation of grid frequency and inertial power regulator frequency to generate an internal angle reference for grid forming control of the IBR.

Clause 14: The system method according to clauses 9-13, wherein the controller is further configured to tune gains applied to the first and second frequency components to be more or less aggressive to the grid events.

Clause 15: A converter controller for providing grid-forming (GFM) control of an inverter-based resource (IBR) connected to an electrical grid, the converter controller comprising:

a controller comprising at least one processor, the at least one processor configured to perform a plurality of operations, the plurality of operations comprising:

monitoring the electrical grid for grid events that cause a change in one or both of grid frequency and angle; and controlling an active power response of the IBR to the grid event by changing an angle of the IBR voltage relative to grid voltage in a manner that mimics an active power response of a GFM source having a certain desired impedance, which may be similar to or different than a hardware impedance of the IBR.

Clause 16: The converter controller according to clause 5, wherein the IBR is a double-fed or full-power conversion generator in a wind turbine power system connected to the electrical grid.

Clause 17: The converter controller according to clauses 15-16, wherein the converter controller is further configured to estimate grid frequency and angle using a phase-locked loop (PLL), wherein changes in grid frequency and angle are reflected in a PLL frequency and a PLL error.

Clause 18: The converter controller according to clauses 15-17, wherein the PLL error becomes non-zero for rapid changes in grid frequency or angle, the converter controller further configured to perform the following operations:

calculate a first frequency component that is a derivate of the PLL error and a second frequency component that is proportional to the PLL error;

sum the first and second frequency components with the PLL frequency to obtain a high-bandwidth estimation of grid frequency;

combine the high-bandwidth estimation of grid frequency with an inertial power regulator frequency; and integrate the combined high-bandwidth estimation of grid frequency and inertial power regulator frequency to generate an internal angle reference for grid forming control of the IBR.

Clause 19: The converter controller according to clauses 15-18, wherein the converter controller is further configured to tune gains applied to the first and second frequency components to be more or less aggressive to the grid events.

Clause 20: The converter controller according to clauses 15-19, wherein the converter controller is further configured to apply a bandpass filter in parallel with the first and second frequency components, the bandpass filter tuned to a frequency to increase the effective impedance of the IBR at predetermined frequencies.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing grid-forming (GFM) control of an inverter-based resource (IBR) connected to an electrical grid, the method comprising:

monitoring the electrical grid for grid events that cause a change in one or both of grid frequency and angle;

controlling, via a controller, an active power response of the IBR to the grid event by changing an angle of the IBR voltage relative to grid voltage in a manner so as to mimic an active power response of an IBR having a certain desired impedance;

wherein the desired impedance is different than a hardware impedance of the IBR;

estimating grid frequency and angle using a phase-locked loop (PLL), wherein changes in grid frequency and angle are reflected in a PLL frequency and a PLL error, wherein the PLL error becomes non-zero for rapid changes in grid frequency or angle, and further comprising calculating a first frequency component that is a derivative of the PLL error and a second frequency component that is proportional to the PLL error; and summing the first and second frequency components with the PLL frequency to obtain a high-bandwidth estimation of grid frequency;

combining the high-bandwidth estimation of grid frequency with an inertial power regulator frequency; and integrating the combined high-bandwidth estimation of grid frequency and inertial power regulator frequency to generate an internal angle reference for grid-forming mode control of the IBR.

2. The method according to claim 1, further comprising tuning gains applied to the first and second frequency components to be more or less aggressive to the grid events.

3. The method according to claim 2, wherein limits are applied to high bandwidth components of estimated grid frequencies, the limits being fixed values or dynamically adjustable values.

4. The method according to claim 1, further comprising applying a bandpass filter in parallel with the first and second frequency components, the bandpass filter tuned to a frequency to increase the effective impedance of the IBR at predetermined frequencies.

5. The method according to claim 1, wherein the IBR is a double-fed wind turbine generator in a wind turbine power system connected to the electrical grid, the double-fed wind turbine generator coupled to a power converter having a line-side converter and a rotor-side converter coupled together via a DC link.

6. A system for controlling a power generating system in grid-forming (GFM) mode, the power system having an inverter-based resource (IBR) connected to an electrical grid, the system comprising:
   a controller comprising at least one processor, the at least one processor configured to perform a plurality of operations, the plurality of operations comprising:
   monitoring the electrical grid for grid events that cause a change in one or both of grid frequency and angle; and
   controlling an active power response of the IBR to the grid event by changing an angle of the IBR voltage relative to grid voltage in a manner that mimics an active power response of a GFM source having a certain desired impedance;
   wherein the controller is further configured to estimate grid frequency and angle using a phase-locked loop (PLL), wherein changes in grid frequency and angle are reflected in a PLL frequency and a PLL error, wherein the PLL error becomes non-zero for rapid changes in grid frequency or angle, the controller further configured to calculate a first frequency component that is a derivative of the PLL error and a second frequency component that is proportional to the PLL error;
   wherein the controller is further configured for:
   summing the first and second frequency components with the PLL frequency to obtain a high-bandwidth estimation of grid frequency;
   combining the high-bandwidth estimation of grid frequency with an inertial power regulator frequency; and
   integrating the combined high-bandwidth estimation of grid frequency and inertial power regulator frequency to generate an internal angle reference for grid-forming control of the IBR.

7. The system according to claim 6, wherein the power generating system comprises a wind turbine power system and the IBR comprises a double-fed wind turbine generator connected to the electrical grid.

8. The system method according to claim 6, wherein the controller is further configured to tune gains applied to the first and second frequency components to be more or less aggressive to the grid events.

9. A converter controller for providing grid-forming (GFM) control of an inverter-based resource (IBR) connected to an electrical grid, the converter controller comprising:
   a controller comprising at least one processor, the at least one processor configured to perform a plurality of operations, the plurality of operations comprising:
   monitoring the electrical grid for grid events that cause a change in one or both of grid frequency and angle; and
   controlling an active power response of the IBR to the grid event by changing an angle of the IBR voltage relative to grid voltage in a manner that mimics an active power response of a GFM source having a certain desired impedance;
   wherein the converter controller is further configured to estimate grid frequency and angle using a phase-locked loop (PLL), wherein changes in grid frequency and angle are reflected in a PLL frequency and a PLL error; and
   wherein the PLL error becomes non-zero for rapid changes in grid frequency or angle, the converter controller further configured to perform the following operations:
   calculate a first frequency component that is a derivate of the PLL error and a second frequency component that is proportional to the PLL error;
   sum the first and second frequency components with the PLL frequency to obtain a high-bandwidth estimation of grid frequency;
   combine the high-bandwidth estimation of grid frequency with an inertial power regulator frequency; and
   integrate the combined high-bandwidth estimation of grid frequency and inertial power regulator frequency to generate an internal angle reference for gating control of the IBR.

10. The converter controller according to claim 9, wherein the IBR is a double-fed generator in a wind turbine power system connected to the electrical grid.

11. The converter controller according to claim 9, wherein the converter controller is further configured to tune gains applied to the first and second frequency components to be more or less aggressive to the grid events.

12. The converter controller according to claim 11, wherein the converter controller is further configured to apply a bandpass filter in parallel with the first and second frequency components, the bandpass filter tuned to a frequency to increase the effective impedance of the IBR at predetermined frequencies.

\* \* \* \* \*